US012136387B2

(12) United States Patent
Ryu et al.

(10) Patent No.: US 12,136,387 B2
(45) Date of Patent: Nov. 5, 2024

(54) FRAME INSERTION AND FRAME RATE SEQUENCING FOR PANEL GLITCH PREVENTION

(71) Applicant: Apple Inc., Cupertino, CA (US)

(72) Inventors: Jie Won Ryu, San Jose, CA (US); Ing-Jye Wang, Saratoga, CA (US); Alex H Pai, Milpitas, CA (US); Alexandre V Gauthier, Santa Clara, CA (US); Ardra Singh, San Francisco, CA (US); Arthur L Spence, San Jose, CA (US); Gihoon Choo, San Jose, CA (US); Hyunsoo Kim, San Diego, CA (US); Hyunwoo Nho, Palo Alto, CA (US); Jenny Hu, Santa Clara, CA (US); Graeme M Williams, San Diego, CA (US); Jongyup Lim, San Jose, CA (US); Kingsuk Brahma, Mountain View, CA (US); Marc J DeVincentis, Palo Alto, CA (US); Peter F Holland, Los Gatos, CA (US); Shawn P Hurley, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/355,342

(22) Filed: Jul. 19, 2023

(65) Prior Publication Data

US 2024/0038154 A1 Feb. 1, 2024

Related U.S. Application Data

(60) Provisional application No. 63/393,672, filed on Jul. 29, 2022.

(51) Int. Cl.
*G09G 3/30* (2006.01)
*G09G 3/3208* (2016.01)
*G09G 3/36* (2006.01)

(52) U.S. Cl.
CPC ....... *G09G 3/3208* (2013.01); *G09G 2310/08* (2013.01); *G09G 2320/0266* (2013.01); *G09G 2320/0626* (2013.01); *G09G 2340/0435* (2013.01)

(58) Field of Classification Search
CPC ............. G09G 3/3208; G09G 2310/08; G09G 2320/0266; G09G 2320/0626; G09G 2340/0435
See application file for complete search history.

(56) References Cited

U.S. PATENT DOCUMENTS 7,692,642 B2 4/2010 Wyatt
9,659,534 B2 5/2017 de Greef
10,600,379 B2 3/2020 Nambi et al.
(Continued)

*Primary Examiner* — Sanghyuk Park
(74) *Attorney, Agent, or Firm* — Fletcher Yoder, P.C.

(57) ABSTRACT

An electronic device may include processing circuitry configured to generate a first frame of image content and a second frame of image content. The second frame of image content is different from the first frame of image content. The electronic device may also include a display configured to display the first frame of image content at a first refresh rate. In response to receiving the second frame of image content, the electronic device may initially increase the refresh rate before tapering back to the first refresh rate while displaying the second frame of image content.

20 Claims, 14 Drawing Sheets

(56) References Cited

U.S. PATENT DOCUMENTS

| | | | | |
|---|---|---|---|---|
| 10,636,362 | B2 | 4/2020 | Koo et al. | |
| 2012/0207208 | A1 | 8/2012 | Wyatt et al. | |
| 2013/0194295 | A1 | 8/2013 | Chan et al. | |
| 2016/0086557 | A1 * | 3/2016 | Watanabe | G09G 3/2007 345/691 |
| 2017/0263201 | A1 * | 9/2017 | Sato | G09G 3/3648 |
| 2018/0075798 | A1 | 3/2018 | Nho et al. | |
| 2021/0201732 | A1 * | 7/2021 | Ranjan | G09G 3/20 |
| 2022/0076627 | A1 | 3/2022 | Kim et al. | |
| 2023/0197013 | A1 * | 6/2023 | Yoon | G09G 3/3266 345/204 |

* cited by examiner

FRAME INSERTION AND FRAME RATE SEQUENCING FOR PANEL GLITCH PREVENTION

CROSS-REFERENCE TO RELATED APPLICATIONS

This application claims priority to U.S. Provisional Application No. 63/393,672, filed Jul. 29, 2022, entitled "FRAME INSERTION AND FRAME RATE SEQUENCING FOR PANEL GLITCH PREVENTION," the disclosure of which is hereby incorporated by reference in its entirety for all purposes.

SUMMARY

The present disclosure relates to systems and techniques for panel glitch prevention for electronic devices operating in a low display refresh rate mode. More specifically, for a period of time, systems and techniques that enable one or more frame insertions and/or a frame rate sequencing to be increased to reduce or eliminate perceivable image artifacts and/or panel glitches.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Electronic displays may display images that present visual representations of information. Accordingly, numerous electronic systems—such as computers, mobile phones, portable media devices, tablets, televisions, virtual-reality headsets, and vehicle dashboards, among many others—often include or use electronic displays. An electronic display may include many thousands to millions of display pixels. In any case, the electronic display may generally display an image by actively controlling light emissions (e.g., luminance) from its display pixels.

An electronic display may take a variety of forms. For example, the electronic display may be an organic light-emitting diode (OLED) display. The OLED display may include display driver circuitry and an active area having a matrix of OLED display pixels connected to cathodes and anodes. The display driver circuitry may receive image data and program the electronic display to display image content based on the image data. A frame of image content may be displayed for a period of time, then a subsequent frame of image content may be displayed for the period of time. A frequency at which image content is replaced or refreshed is referred to as "refresh rate." The display driver circuitry may program the display pixels with data signals indicative of the image content and subsequently provide an emission signal to the display pixels, causing the display pixels to emit light to create the image content. Settings associated with display pixels may change, such as from one frame of image content to another frame of image content. In certain instances, a higher refresh rate may correspond to a smoother transition between image content since frames of image content are replaced at a higher frequency.

In certain instances, it may be desirable to lower output power during electronic display operations in which the image content is not rapidly changing. During these operations, the display may implement a lower refresh rate (e.g., extended blanking of the display). By reducing the refresh rate, driver circuitry of the electronic display may be operated at a lower rate, which may lower the power consumption of the display and save power. However, operating at significantly lower display refresh rates (e.g., 10 Hertz (Hz), 1 Hz) may increase susceptibility to display panel hysteresis due to infrequent in-pixel compensation that occurs with display programming. Error (e.g., image artifacts, luminance changes) within frames of image content may accumulate over time resulting in front of screen errors, such as flickering or ghosting. As such, at lower refresh rates, image content displayed on the display may include visible image artifacts due to the display panel hysteresis.

Additionally or alternatively, the display pixels may natively experience hysteresis during display operations. For example, luminance of the display pixels may change over time due to changes in voltage supplied to the display pixel, current supplied to the display pixel, or a combination thereof. A hysteresis profile of the display pixel may be illustrated as an exponential decay from one state to another state (e.g., first luminance, second luminance) and may be associated with an amount of time for the display pixel to stabilize when changing from one image content to another image content. To determine a luminance change between frames of image content, the hysteresis profile may be chopped into discreet parts referred to as "sampling." At higher refresh rates, the hysteresis of the display pixel may not be visible to a viewer due to frequent refreshes of the image content or frequent sampling of the hysteresis profile. However, at lower refresh rates, the hysteresis of the display pixel may result in visible differences in luminance over time. As such, the viewer may see front of screen errors (e.g., image artifacts, flickering, ghosting) within the image content displayed. In other words, lower refresh rates may cause error accumulation over time due to the infrequent sampling, and as such, the viewer may perceive front of screen errors in the image content.

Accordingly, the present disclosure is directed to frame rate sequencing from a temporarily increased refresh rate to a low refresh rate while the electronic device is operating in the low refresh rate mode. When the electronic device determines a frame of new image content, the refresh rate may be temporarily increased by inserting one or more frames of image content, then slowly sequencing down to the lower refresh rate. The temporarily increased refresh rate may be sufficient to allow hysteresis effects (e.g., charge accumulation) of the display pixel to dissipate at a level beneath human perception (e.g., the viewer). The temporarily increased refresh rate may be sequenced (e.g., tapered) back down to a lower refresh rate as the image content stays the same or is sufficiently similar from one frame to the next. As such, image artifacts due to changing image content at lower refresh rates may be reduced or eliminated and the electronic display may save power by maintaining operations in the low refresh rate mode.

Various refinements of the features noted above may exist in relation to various aspects of the present disclosure. Further features may also be incorporated into these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
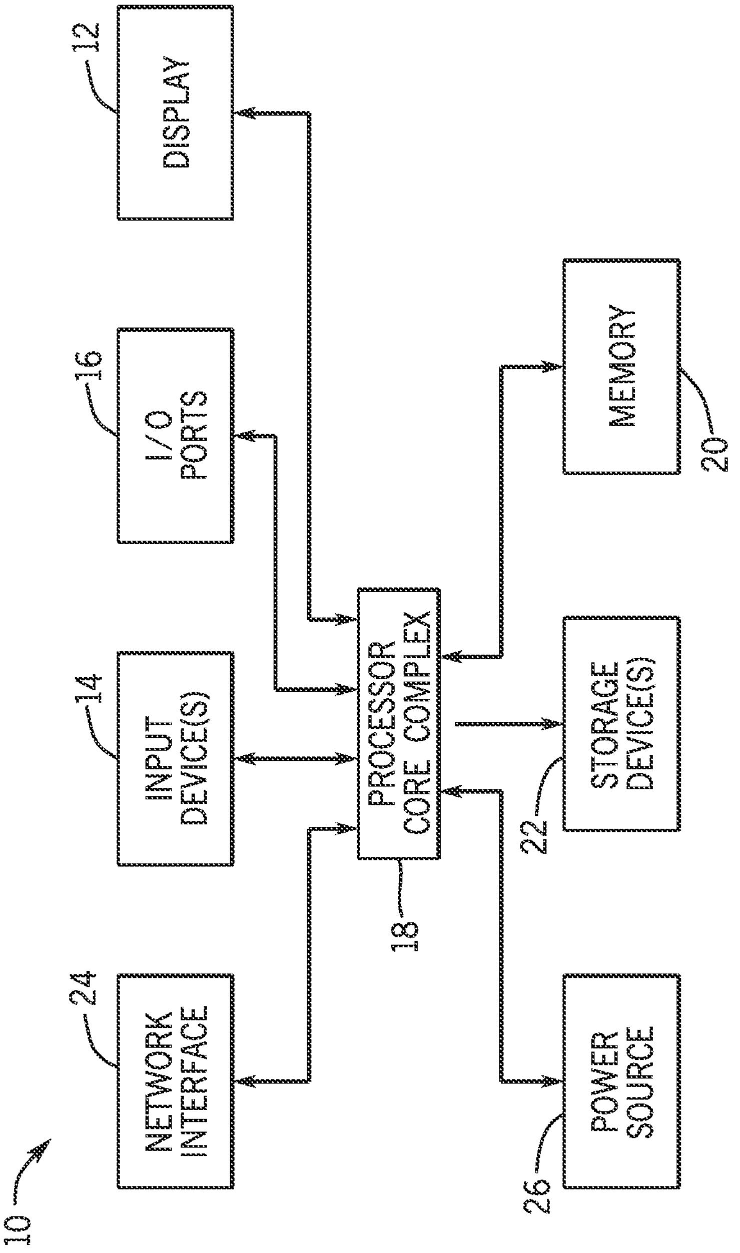
FIG. 1 is a schematic block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Many electronic devices may use display panels to show image content to users. User display panels may be pixel-based panels, such as light-emitting diode (LED) panels, organic light-emitting diodes (OLED) panels and/or plasma panels. In many devices, such as televisions, smartphones, computer panels, smartwatches, among others, pixel-based displays are employed to show content and/or provide a user interface. Display driver circuitry may program the display pixels with data signals indicative of image content. For example, the image content may include multiple frames that can be displayed and refreshed over a period of time. By way of example, a 60 Hertz (Hz) display may refresh, and/or update the image content, 60 times per second.

In certain instances, the image content may be displayed for an extended period of time or the image content may not substantially change from frame to frame. As such, it may be beneficial to operate in a low refresh rate mode to save power. For example, operating in the low refresh rate mode, the electronic device may operate using a refresh rate of 1 Hz, 5 Hz, 10 Hz, and so on. Additionally or alternatively, the display driver circuitry may program the display pixels less frequently and/or the display panel may refresh less frequently, resulting in increased susceptibility to display panel hysteresis.

In addition, the display pixels may have a native hysteresis. Hysteresis may be caused by changes in voltage, changes in current, continuous cycling of a transistor, unwanted charge accumulation, or the like. When image content changes from one frame to another, the display pixels may take a finite amount of time to stabilize to the desired settings programmed into the pixels, as such the resulting image content may deviate from the ideal (e.g., desired settings). At a higher refresh rate, the hysteresis effects (e.g., hysteresis effects) may not be visible to a viewer due to frequent refreshing or frequent in-pixel compensation. However, at the lower refresh rate, the hysteresis effects may be visible due to infrequent refreshing of the display pixels or less frequent in-pixel compensation. As such, image content displayed on the display panels may include front of screen errors which may be visible to the viewer.

Embodiments described herein are related to system and techniques for panel glitch (e.g., front of screen error) prevention while the electronic device operates in the low refresh rate mode. More specifically, the present disclosure discusses temporarily increasing the refresh rate for a period of time and sequencing down to the lower refresh rate while the electronic device operates in the low refresh rate mode to reduce or eliminate front of screen errors.

With the foregoing in mind, a general description of suitable electronic devices that may employ an enhanced overdrive to provide an improved response to changed display settings is described herein. Keeping the foregoing in mind, an electronic device 10 including an electronic display 12 (e.g., display device) is shown in FIG. 1. As is described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

The electronic display 12 may be any suitable electronic display. For example, the electronic display 12 may include a self-emissive pixel array having an array of one or more self-emissive pixels. The electronic display 12 may include any suitable circuitry to drive the self-emissive pixels, including for example row driver and/or column drivers (e.g., display drivers). Each of the self-emissive pixels may include any suitable light-emitting element, such as a LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used. The self-emissive pixel may be coupled to a transistor that regulates current or voltage flow to the self-emissive pixels. In certain embodiments, the self-emissive pixel and the transistor may have native hysteresis or unwanted electrical signal effects. For example, the transistor parameters may be dependent on a gate voltage (e.g., direction, time), a loading history, or the like. A change in transistor characteristics may influence the self-emissive pixels, thereby influencing the light-emitting properties of the self-emissive pixels.

In the depicted embodiment, the electronic device 10 includes the electronic display 12, one or more input devices 14, one or more input/output (I/O) ports 16, a processor core complex 18 having one or more processor(s) or processor cores, local memory 20, a main memory storage device 22, a network interface 24, a power source 26 (e.g., power supply), and image processing circuitry 28. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. The image processing circuitry 28 (e.g., a graphics processing unit) may be included in the processor core complex 18.

The processor core complex 18 may execute instructions stored in local memory 20 and/or the main memory storage device 22 to perform operations, such as generating and/or transmitting image data. As such, the processor core complex 18 may include one or more general purpose microprocessors, one or more application specific integrated circuits (ASICs), one or more field programmable logic arrays (FPGAs), or any combination thereof.

In addition to instructions, the local memory 20 and/or the main memory storage device 22 may store data to be processed by the processor core complex 18. Thus, the local memory 20 and/or the main memory storage device 22 may include one or more tangible, non-transitory, computer-readable mediums. For example, the local memory 20 may include random access memory (RAM) and the main memory storage device 22 may include read-only memory (ROM), rewritable non-volatile memory such as flash memory, hard drives, optical discs, and/or the like.

The network interface 24 may communicate data with another electronic device and/or a network. For example, the network interface 24 (e.g., a radio frequency system) may enable the electronic device 10 to communicatively couple to a personal area network (PAN), such as a Bluetooth network, a local area network (LAN), such as an 1622.11x Wi-Fi network, and/or a wide area network (WAN), such as a 4G or Long-Term Evolution (LTE) cellular network.

The processor core complex 18 is operably coupled to the power source 26. The power source 26 may provide electrical power to one or more components in the electronic device 10, such as the processor core complex 18 and/or the electronic display 12. Thus, the power source 26 may include any suitable source of energy, such as a rechargeable lithium polymer (Li-poly) battery and/or an alternating current (AC) power converter.

The processor core complex 18 is operably coupled with the one or more I/O ports 16. The I/O ports 16 may enable the electronic device 10 to interface with other electronic devices. For example, when a portable storage device is connected, the I/O port 16 may enable the processor core complex 18 to communicate data with the portable storage device.

The electronic device 10 is also operably coupled with the one or more input devices 14. The input device 14 may enable user interaction with the electronic device 10, for example, by receiving user inputs via a button, a keyboard, a mouse, a trackpad, and/or the like. The input device 14 may include touch-sensing components in the electronic display 12. The touch-sensing components may receive user inputs by detecting occurrence and/or position of an object touching the surface of the electronic display 12.

In addition to enabling user inputs, the electronic display 12 may include one or more display panels. Each display panel may be a separate display device or one or more display panels may be combined into a same device. The electronic display 12 may control light emission from the display pixels to present visual representations of information, such as a graphical user interface (GUI) of an operating system, an application interface, a still image, or video content, by displaying frames based on corresponding image data. As depicted, the electronic display 12 is operably coupled to the processor core complex 18 and the image processing circuitry 28. In this manner, the electronic display 12 may display frames based on image data generated by the processor core complex 18 and/or the image processing circuitry 28. Additionally or alternatively, the electronic display 12 may display frames based on image data received via the network interface 24, an input device 14, an I/O port 16, or the like.

Figure 2:
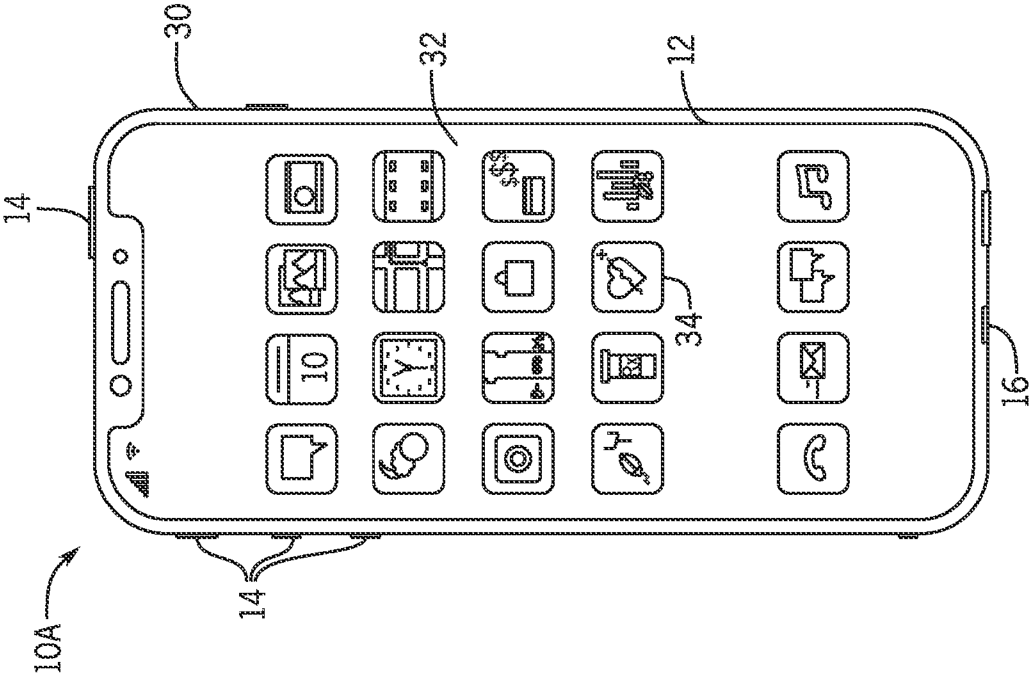
FIG. 2 is a front view of a hand-held device representing an embodiment of the electronic device of FIG. 1, in accordance with an embodiment.

As described above, the electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, and/or the like. For illustrative purposes, the handheld device 10A may be a smartphone, such as any iPhone® model available from Apple Inc.

The handheld device 10A includes an enclosure 30 (e.g., housing). The enclosure 30 may protect interior components from physical damage and/or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 may be accessed through openings in the enclosure 30 and may include, for example, an audio jack to connect to external devices.

Figure 3:
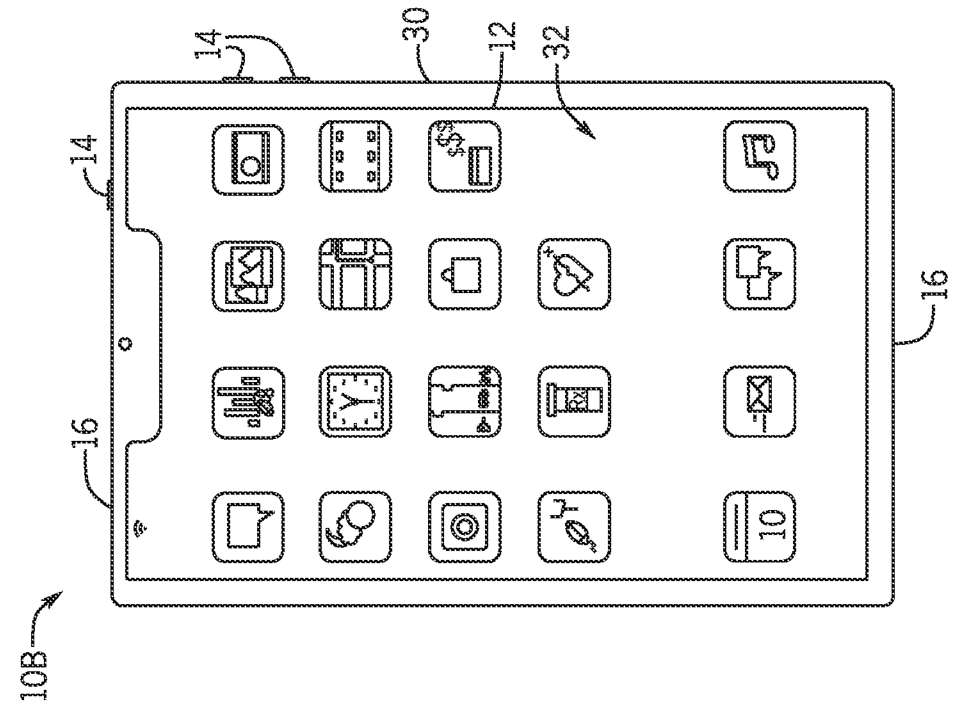
FIG. 3 is a front view of another hand-held device representing another embodiment of the electronic device of FIG. 1, in accordance with an embodiment.
Figure 4:
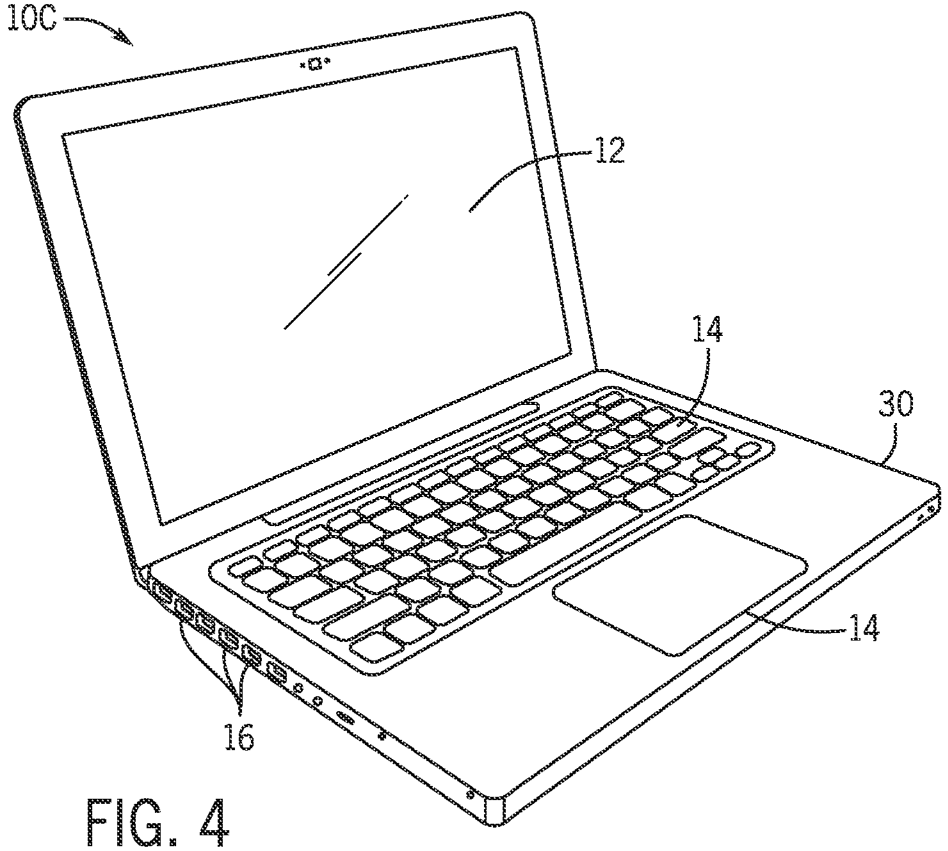
FIG. 4 is a perspective view of a notebook computer representing an embodiment of the electronic device of FIG. 1, in accordance with an embodiment.
Figure 5:
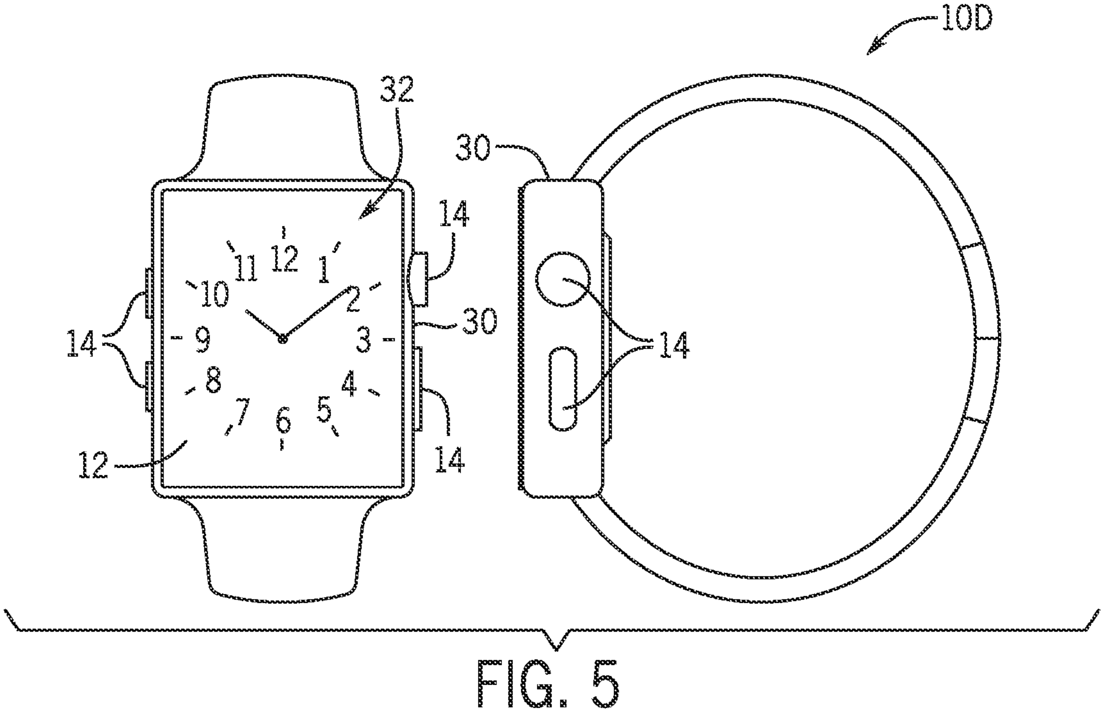
FIG. 5 is a front view and side view of a wearable electronic device representing another embodiment of the electronic device of FIG. 1, in accordance with an embodiment.

Another example of a suitable electronic device 10, specifically a tablet device is shown in FIG. 3. The tablet device 10B may be any iPad® model available from Apple Inc. A further example of a suitable electronic device 10, specifically a computer is shown in FIG. 4. For illustrative purposes, the computer 10C may be any MacBook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
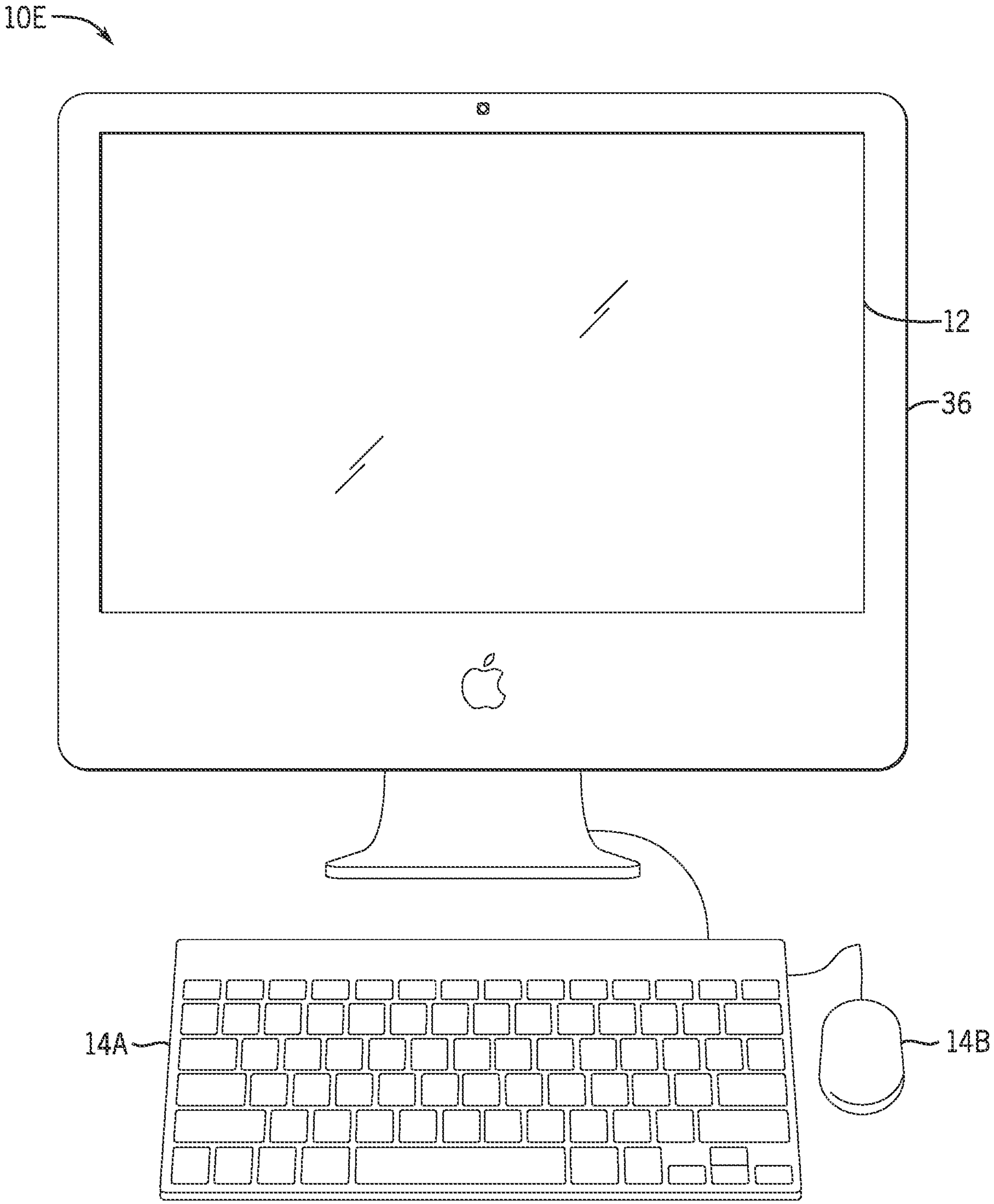
FIG. 6 is a front view of a desktop computer representing another embodiment of the electronic device of FIG. 1, in accordance with an embodiment.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input devices 14, such as the keyboard 14A or mouse 14B (e.g., input devices 14), which may connect to the computer 10E.

Figure 7:
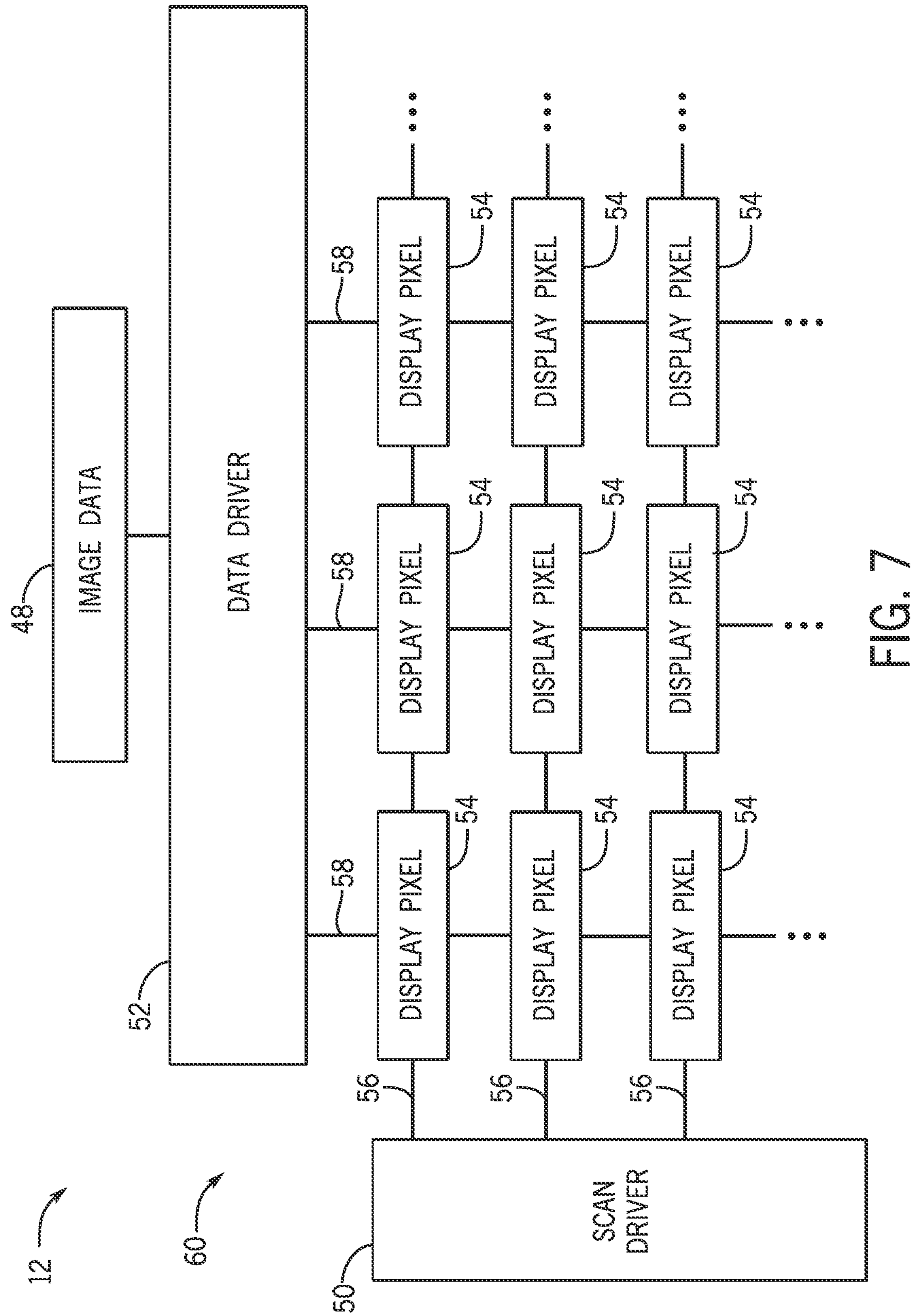
FIG. 7 is a block diagram of an electronic display with a display pixel, in accordance with an embodiment.

As shown in FIG. 7, the electronic display 12 may receive image data 48 for display on the electronic display 12. The electronic display 12 includes display driver circuitry 60 that includes scan driver 50 and data driver 52 that can program the image data 48 onto display pixels 54 of an active area. The display pixels 54 may each contain one or more self-emissive elements, such as a light-emitting diodes (LEDs) (e.g., organic light emitting diodes (OLEDs) or micro-LEDs (RLEDs)). Different display pixels 54 may emit different colors. For example, some of the display pixels 54 may emit red light, some may emit green light, and some may emit blue light. Thus, the display pixels 54 may be driven to emit light at different brightness levels to cause a user viewing the electronic display 12 to perceive an image formed from different colors of light. The display pixels 54 may also correspond to hue and/or luminance levels of a color to be emitted and/or to alternative color combinations, such as combinations that use cyan (C), magenta (M), and yellow (Y), or any other suitable color combinations.

The scan driver 50 may provide scan signals (e.g., pixel reset, data enable, on-bias stress) over any suitable number of scan lines 56 per row to control the display pixels 54 by row. For example, the scan driver 50 may cause a row of the display pixels 54 to become enabled to receive a portion of the image data 48 from data lines 58 from the data driver 52. In this way, an image frame of image data 48 may be programmed onto the display pixels 54 row by row. Other examples of the electronic display 12 may program the display pixels 54 in groups other than by row. At higher refresh rates, the image data 48 may be programmed into the display pixels 54 more frequently than at lower refresh rates. The display pixels 54 may receive frequent in-pixel compensation at higher refresh rates, as such error within the image data 48 may be quickly corrected by a subsequent programmed image data. At lower refresh rates, errors may accumulate over time due to infrequent programming of the display pixels 54.

For the display pixels 54 to emit light, the self-emissive elements of the display pixels 54 may receive a voltage from a cathode and/or an anode. For example, the self-emissive element may be an OLED. When the voltage is applied across the OLED, the OLED may light up causing the associated display pixel 54 to emit light. To provide the voltage, the cathode and the anode may be coupled to power supply circuitry. The cathode and anode may also be coupled to a transistor that controls the voltage or current to the OLED. The electronic device 10 may include a power management integrated circuitry (PMIC) (e.g., via the processor core complex 18 and/or the processing circuitry) that provides power supply circuitry to the electronic display 12. As discussed above, the display driver circuitry 60 may implement one or more clock control operations during extended blanking mode display operations (e.g., low refresh rate mode) of the electronic display 12.

The transistor and/or the OLED may have a native hysteresis over time. Hysteresis of the transistor may be caused by a gate voltage sweep range, a direction or time of the voltage, a loading history, or the like. For example, over time, a voltage or a current may leak out of the transistor resulting in differing voltages or currents supplied to the OLED, thereby changing the emission (e.g., luminance) of the associated display pixel 54. In another example, over time, continuous loading and unloading of the transistor may result in physical changes to the transistor which may reduce device stability or reliability. Still in another example, the OLED may have unwanted charge accumulation over time, as such the emission of the associated display pixel 54 may deviate from the ideal. Additionally or alternatively, the associated display pixel 54 may have a native hysteresis when changing from a first state to a second state. When image content is displayed for a period of time, the luminance of the display pixels 54 may slowly change (e.g., decrease) over time. When image data 48 includes multiple frames of changing image content, the display pixels 54, changing from one frame of image content to another frame of image content, may need a finite amount of time to stabilize. The resulting image content may deviate from the ideal (e.g., image content corresponding to the image data 48) resulting in front of screen errors (e.g., flickering, ghosting, image artifacts). The hysteresis profile of the display pixel 54 may be illustrated in FIGS. 8 and 9.

Figure 8:
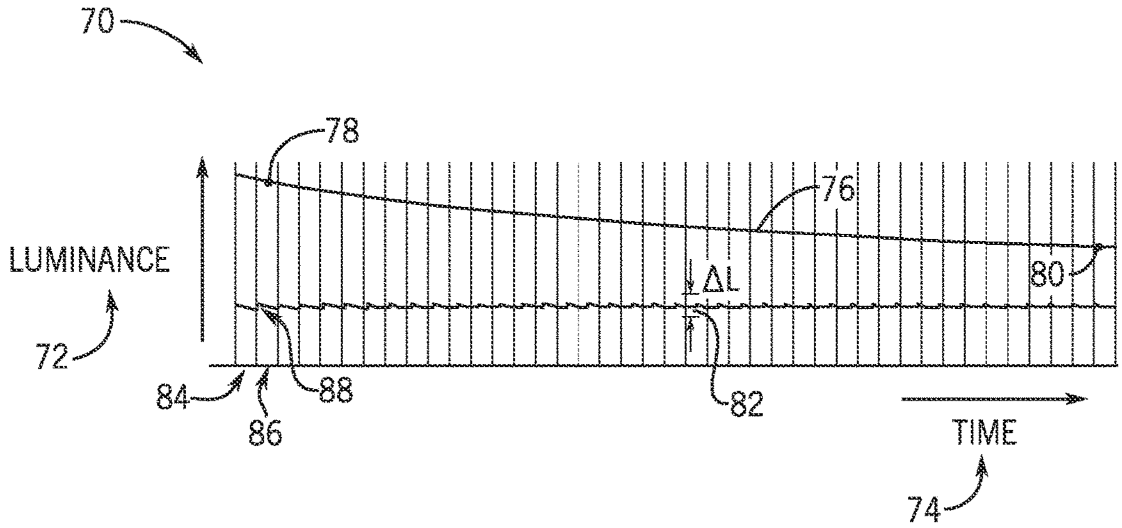
FIG. 8 is a graph illustrating a hysteresis profile of the display pixel and sampling at a refresh rate, in accordance with an embodiment.

At higher refresh rates, the viewer may not see the hysteresis effects caused by the display pixels 54 due to frequent in-pixel compensation or refreshes of image content displayed on the display 12. FIG. 8 illustrates a graph 70 depicting a hysteresis profile 76 of the display pixels 54, which may be measured as a luminance 72 over time 74. The hysteresis profile 76 of the display pixel 54 may correspond with an exponential curve (e.g., exponential decay). As illustrated, the display pixel 54 may display a first luminance 72 at point 78 and, over a period of time 74, display a second luminance 72 at point 80. The second luminance 72 may be less than the first luminance 72. In other words, the luminance 72 of the display pixel 54 may decay over time 74 due to hysteresis of the display pixel 54. Additionally or alternatively, over time 74, the luminance of the display pixel 54 may stabilize to a static luminance.

The hysteresis profile 76 may be seen to affect luminance according to a frequency corresponding to the refresh rate of the display 12. As described herein, the image data 48 may be programmed onto the display pixels 54 according to the refresh rate to produce one frame of image content. As discussed herein, frequent refreshing may reduce the hysteresis effects of the display pixels 54. For example, as illustrated by line 82, the change in luminance 88 may be small when the display pixels 54 may be frequently refreshed. A second hysteresis profile 76 illustrates the luminance 72 of the display pixel 54 remaining constant or nearly constant over time 74 when frequent refreshing is used. By way of example, the refresh rate may be 20 Hz or in-pixel compensation may occur every 50 milliseconds (ms). In other words, a frame of image content may be displayed for 50 ms before changing to another frame of image content. When displaying a first frame 84 of image content, the display pixel 54 may display a luminance 72 that decays during a period of the first frame 84 due to the hysteresis. However, after a refresh, the display pixel 54 may display a second frame 86 at the first luminance 72 (or approximately the first luminance 72) that decays over time. As the display pixel 54 transitions from displaying the first frame 84 to displaying the second frame 86, a small change in luminance (as illustrated by a vertical line segment 88) may occur. Due to frequent refreshes, the change in luminance 72 may not be visible or barely visible to the viewer. For example, the viewer may not see the change in luminance if the change is below a threshold luminance change detectable by the viewer. As such, the hysteresis of the display pixel 54 may not result in front of screen errors visible to the viewer.

Figure 9:
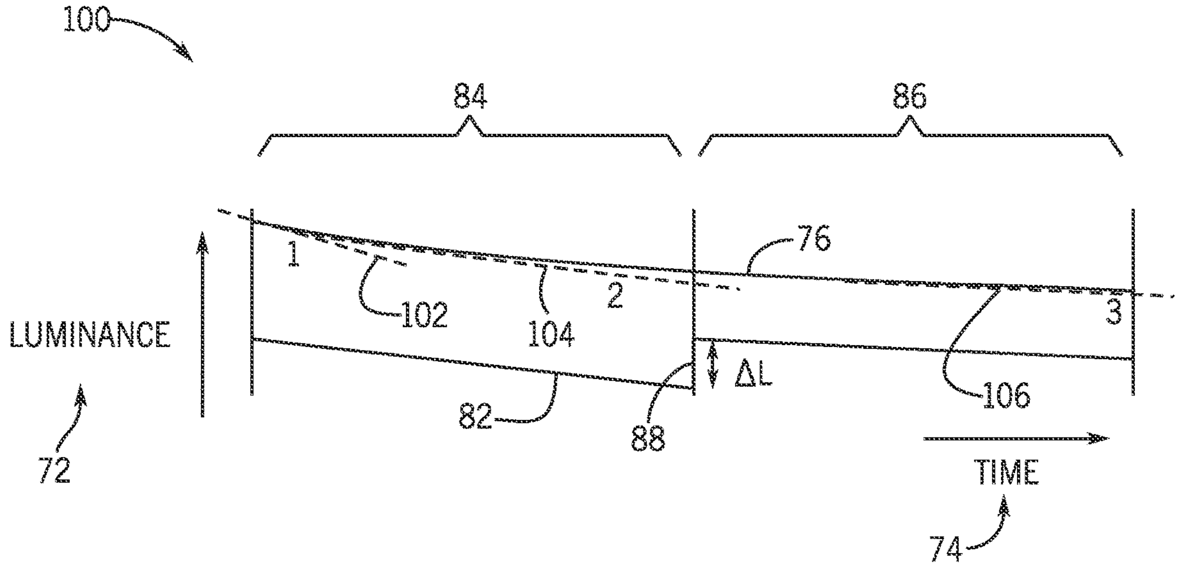
FIG. 9 is a graph illustrating a close-up view of the hysteresis profile of the display pixel and sampling at a refresh rate, in accordance with an embodiment.

FIG. 9 illustrates a graph 100 depicting a close-up view of the hysteresis profile 76 of the display pixels 54, which may be measured as the luminance 72 over time 74. For example, the hysteresis profile 76 illustrates a decay from the first luminance 72 to the second luminance 72 over time 74. At lower refresh rates, the hysteresis of the display pixel 54 may cause changes in luminance 72 as the display pixels 54 display a first frame of image content and a second frame of image content different from the first frame. For example, the low refresh rate may be 1 Hz. As further described below, the change in luminance 72 at the lower refresh rate may be greater than the change in luminance 72 at the higher refresh rate described in reference to FIG. 8.

With the foregoing in mind, the hysteresis profile 76 starts at the first luminance and decaying to the second luminance over time 74. The display pixel 54 may display the first frame 84 of image content at the first luminance that decays over time 74 followed by the second frame 86 at the first luminance (or approximately the first luminance). Due to the lower refresh rate, the luminance of the display pixel 54 may have a longer period of time to decay in comparison to the higher refresh rate. As such, transitioning from the first frame 84 to the second frame 86 with a lower refresh rate may result in a large change in luminance in comparison to transitioning with the higher refresh rate. Indeed, the lower refresh rate may result in a greater luminance change as compared to the higher refresh rate described with reference to FIG. 8.

In certain instances, it may be beneficial to temporarily increase the refresh rate to reduce or eliminate the hysteresis effects of the display pixels 54. For example, lines 102, 104, and 106 may be a slope change (e.g., derivative) of the hysteresis profile 76. Line 102 illustrates a slope change at the start of the first frame 84 and line 104 illustrates a slope change at the middle of the first frame 84. Indeed, line 102 may have a larger slope change compared to line 104 indicating a greater change in luminance at the start of the first frame 84. Line 106 illustrates a slope change at the end of the second frame 86. Over time, the hysteresis profile may flatten out and, as illustrated by line 106, the slope may be small or nearly constant. The slope changes of lines 102, 104, and 106 may correspond to a luminance shift of the display pixels 54 that may be reduced or eliminated by in-pixel compensation or a slightly higher refresh rate. As such, it may be beneficial to temporarily increase the refresh rate when the hysteresis profile is sharp (e.g., larger slope change) and keep a lower refresh rate when the hysteresis profile is shallow (e.g., smaller slope change).

Figure 10:
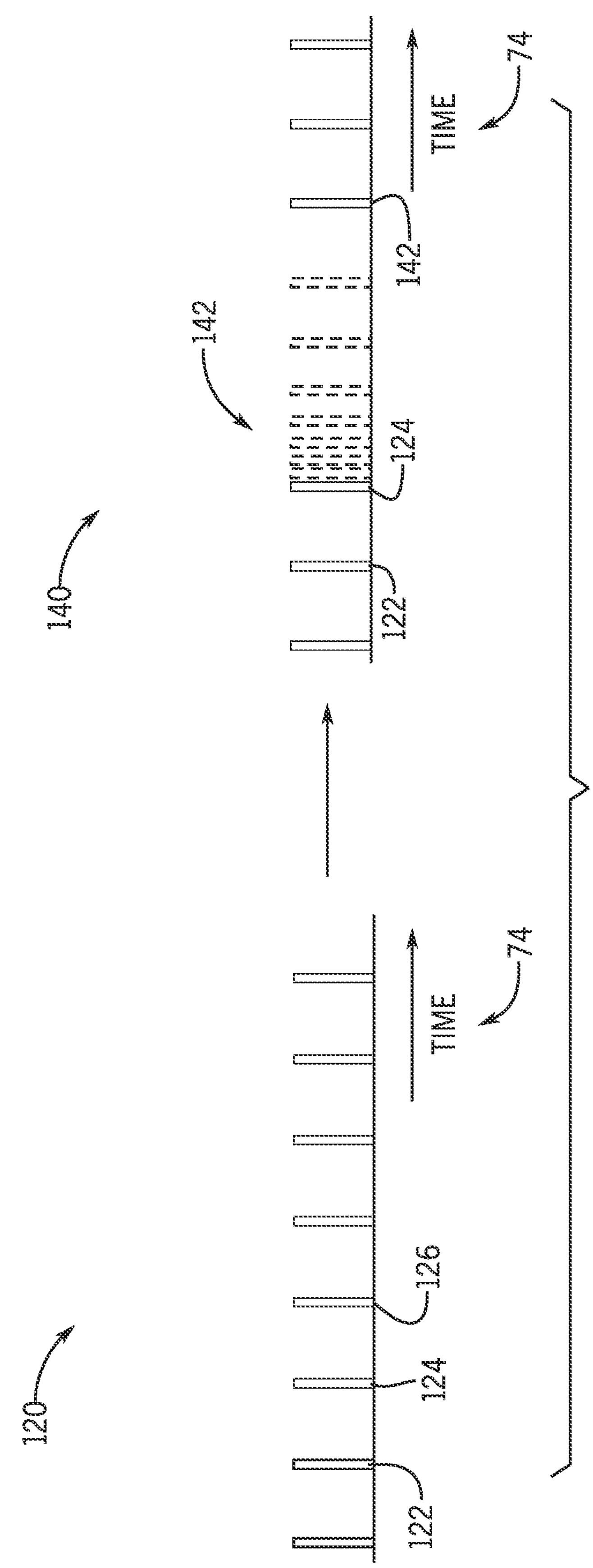
FIG. 10 is a timing diagram illustrating insertion of multiple frames of image content in a low refresh rate mode, in accordance with an embodiment.

When the image content changes, the electronic display 12 may implement (via processing circuitry) the frame rate sequencing technique to reduce or eliminate image artifacts for an initial optical response (e.g., first frame response, second frame response). FIG. 10 depicts a timing diagram 120 of displaying multiple frames of image content on the electronic display 12 while in the low refresh rate mode. For example, for 1 Hz refresh rate, the period of time for displaying one frame may be 1 second. In another example, for a 20 Hz refresh rate, the period of time for displaying one frame of image content may be 50 ms.

In certain instances, image content may remain the same or may not substantially change from one frame to another frame, as such the electronic display 12 may save power by operating in the low refresh rate mode. When image content is similar or substantially similar, the hysteresis profile of the display pixel 54 may level out, as such little or no luminance changes may occur between frames of image content. Further, the display driver circuitry 60 may save power by reducing a number of times image data 48 is programmed onto the display pixels 54.

However, in certain instances, the image content may substantially change from a first frame 122 to a second frame 124, thereby causing image artifacts. For example, the display 12 may display the first frame 142 for a period of time, then transition to displaying the second frame 144 displaying image content different from the image content of the first frame 42. For example, the display driver circuitry 60 may drive the display pixels 54 to display a first luminance associated with the first frame 122 and a second luminance associated with the second frame 124 that is different from the first luminance. As such, the initial optical response of the display pixels 54 may be poor as the display pixels 54 require a period of time to stabilize. Additionally or alternatively, as described herein, the luminance of the display pixels 54 may decay during the period of time of each frame. As such, transitioning between the first frame 122 and the second frame 124 may result in front of screen errors, such as flickering, ghosting, image artifacts, or the like. Indeed, due to the low refresh rate of the display 12, the error may be present within the image content within the second frame 124.

Over time, the hysteresis profile of the display pixel 54 may smooth or level out, as such front of screen errors for subsequent frames of similar image content may be reduced or eliminated. The display driver circuitry 60 may reprogram the display pixels 54 to display image content of a third frame 126, which may be similar or substantially similar to the image content of the second frame 124. Reprogramming the display pixels 54 may reduce or eliminate the error from the second frame 124 or allow the display pixels 54 to stabilize. Due to the native hysteresis of the display pixel 54, the transition from the second frame 124 to the third frame 126 may include a luminance change, however the change may be small since image content remains similar or substantially similar. Indeed, the hysteresis profile of the display pixels 54 may be leveled out or constant. As such, subsequent frames of similar or substantially similar image content may have reduced or eliminated image artifacts.

The electronic display 12 may implement the frame rate sequencing technique may reduce or eliminate image artifacts within the initial optical response. The timing diagram 140 illustrates inserting multiple frames after new image content is displayed on the display 12. The display driver circuitry 60 may determine whether a subsequent frame of image content is different or substantially different from the current frame being displayed. As such, the display driver circuitry 60 may temporarily increase the refresh rate and sequence the refresh rate back down to the low refresh rate to reduce or eliminate front of screen artifacts.

For example, the first frame 122 may display image content different or substantially different from the second frame 124. Following the second frame 124, the display driver circuitry 60 may drive the display pixels 54 to display multiple frames of image content at an increased refresh rate. In other words, one or more frames may be inserted, or inserted frames 142, following a transition to new image content. As such, error introduced in the second frame 124 may be quickly written over when the display driver circuitry 60 reprograms the display pixels 54 in quick succession. After a period of time, the display driver circuitry 60 may sequence down the increased refresh rate to the low refresh rate referred to as "walkdown."

By way of example, over two periods, the display driver circuitry 60 may drive the display pixels 54 to display the inserted frames 142 at the increased refresh rate. Initially, the display pixels 54 may display the inserted frames 142 at a high refresh rate and subsequently space out the timing of the inserted frames 142 to sequence down to the low refresh rate. In this way, the hysteresis profile of the display pixel 54 may be distributed over the inserted frames, as such the change in luminance is not visible to the viewer. Over time as the hysteresis profile levels out, the refresh rate may also be decreased. As such, the display 12 may save power by operating in the low refresh rate mode.

Panel physics of the electronic display 12 may be calibrated to optimize the walkdown from the high refresh rate to the lower refresh rate. For example, a larger panel may require multiple periods (e.g., longer period of time) for the walkdown to reduce or eliminate hysteresis effects. In another example, the self-emissive elements of the display 12 may have differing properties and/or require staggered emission timing, thereby increasing or decreasing the period of time for the walkdown.

Figure 11:
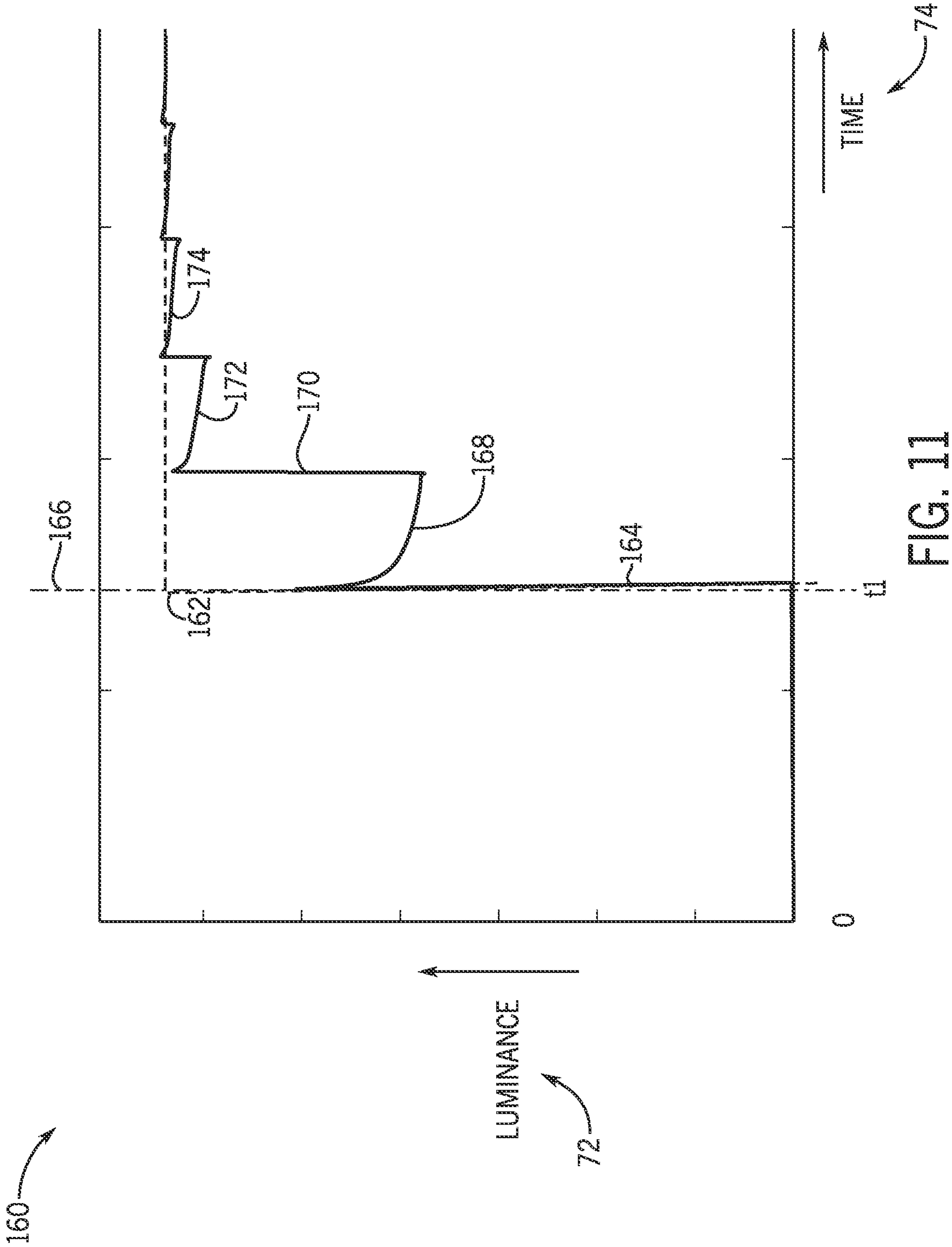
FIG. 11 is a graph illustrating luminance of the electronic display of FIG. 7 over time in the low refresh rate mode, in accordance with an embodiment.

FIG. 11 depicts a graph 160 illustrating the luminance 72 of the display 12 over time 74 for the initial optical response. The graph 160 includes a first line 162 illustrating an ideal luminance response of the display 12 and a second line 164 illustrating the luminance 72 of the display 12 operating in the low refresh rate mode. In certain instances, the display driver circuitry 60 may determine that a subsequent frame of image content may be different or substantially different from the current frame of image content being displayed. When image content is different or substantially different, the initial optical response of the display pixels 54 may not match the settings programmed into the display pixels 54, as such front of screen errors may be visible to the viewer. Indeed, at time t=t1, the image content displayed on the display 12 may transition from the current frame to the subsequent frame.

In certain instances, the display pixels 54 may display the luminance 72 associated with the programmed settings at the initial optical response. At point 166, the line 162 is vertical, which corresponds to an ideal luminance response when transitioning from the current frame to the subsequent frame. At the subsequent frame, the line 162 is horizontal indicating that the initial optical response of the subsequent frame may immediately match the settings (e.g., programmed into the display pixels 54 via image data).

However, the display pixels 54 may have a native hysteresis hindering the initial optical response from displaying the programming settings. While operating in the low refresh rate mode, the display 12 may infrequently refresh the image content displayed and hysteresis effects of the display pixels 54 may be seen as changes in luminance 72. As illustrated by line 164, the image content displayed on the display 12 may include changes in luminance over time 74. At point 166, the line 164 may transition from the current frame of image content to the subsequent frame of image content, however the line 164 may not reach the desired luminance at the initial optical response. In comparison, the line 164 may reach ¾ of the desired luminance illustrated by line 162. A line segment 168 illustrates a decay in luminance for a period of time. Hysteresis of the display pixels 54 may result in changes in luminance 72 over time, which may be seen as a decay from a first luminance to a second luminance. When the display driver circuitry 60 refreshes the image content onto the display pixels 54 to create a new frame of image content, the display driver circuitry 60 may drive the display pixels 54 to emit a signal at the desired luminance.

A line segment 170 illustrated the increase in luminance of the display 12 when the display driver circuitry 60 drives the display pixels 54 to create a subsequent frame of image content that is the same or substantially similar to the current frame of image content. The initial optical response of the display 12 may match the desired settings. Indeed, as illustrated by line segment 172 hysteresis of the display pixels 54 may cause a change in luminance. The display driver circuitry 60 may refresh the image content by driving the display pixels 54 to create image content displayed on the display 12. The luminance 72 may reach the desired luminance. For example, line segment 174 may intersect with the line 162, illustrating that the display 12 may be displaying the settings of the next frame.

Over time, the line 164 may level out, depicting that the display pixels 54 have stabilized and subsequent frames of image content may be displayed without visible changes in luminance. When displaying similar or substantially similar frames of image content, the display 12 may operate in the low refresh rate mode to save power.

Figure 12:
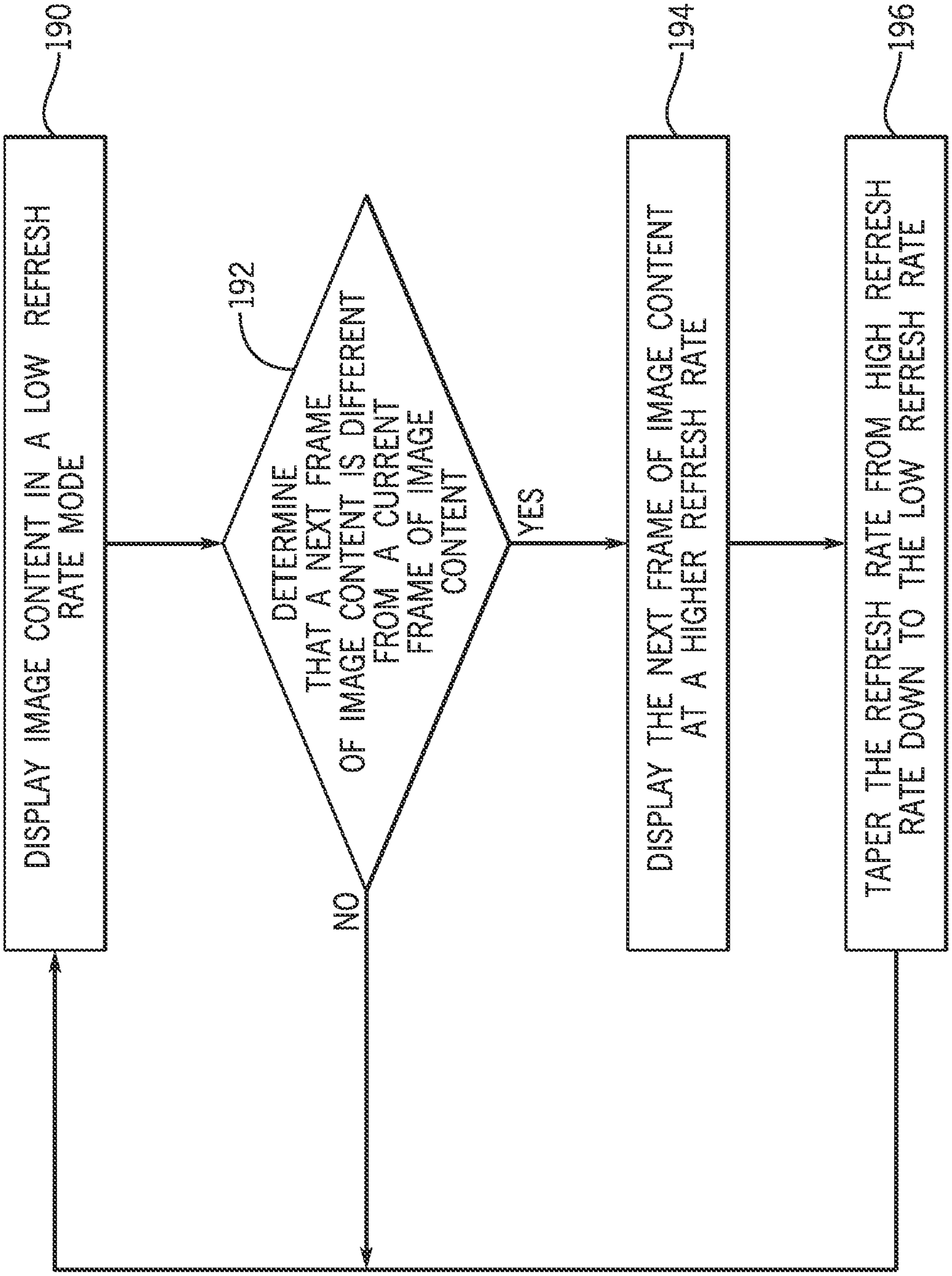
FIG. 12 is a flow chart for changing a frame of image content displayed on the electronic display of FIG. 7 in the low refresh rate mode, in accordance with an embodiment.

FIG. 12 is a flow chart for implementing the frame sequencing technique to temporarily increase the refresh rate. At block 190, the display driver circuitry 60 may cause the display pixels 54 to display a frame image content on the display 12 in a low refresh rate mode. For example, the display driver circuitry 60 receive image data and program the image data into the display pixels 54. The display driver circuitry 60 may drive the display pixels 54 to display the image content according to the low refresh rate. At the low refresh rate, the image content may change once every second (1 Hz). The display driver circuitry 60 may implement a clock control signal to drive the display pixels 54 one every second. In certain instances, a transistor may switch on to allow voltage and/or current to flow to the self-emissive elements to light up the associated display pixel 54 to display the image content. Additionally or alternatively, the display driver circuitry 60 may program image data onto the display pixels 54 at the low refresh rate. In this way, the image content may be refreshed at the low refresh rate.

At block 192, the display driver circuitry 60 may receive a new frame of image content different from the current frame of image content being displayed on the display 12. For example, the new frame of image content may include different gray levels. In another example, the new frame of image data may include same or substantially similar gray levels as the current frame. As such, the display driver circuitry 60 may program the image data 48 onto the display pixels 54 at a low refresh rate and drive the display pixels 54 according to the low refresh rate mode.

If the display driver circuitry 60 determines that the new frame of image content is different from the current frame of image content, then the display driver circuitry 60 may temporarily increase the refresh rate to reduce or eliminate hysteresis effects of the display pixels 54. At block 194, the display driver circuitry 60 may display the new frame of image content at a higher refresh rate. For example, the display driver circuitry 60 may implement the frame insertion technique and temporarily increase the refresh rate by inserting multiple frames of image content. Additionally or alternatively, the display driver circuitry 60 may program and drive the display pixels 54 to emit light at the higher refresh rate. As such, the display pixels 54 may generate image content corresponding to the image data.

At block 196, the display driver circuitry 60 may taper (e.g., sequence) the refresh rate from the higher refresh rate down to the low refresh rate. For example, the refresh rate may be tapered from the higher refresh rate back down to the lower refresh rate. The display driver circuitry 60 may space out a timing of subsequent frames. Additionally or alternatively, the display driver circuitry 60 may walkdown the frequency at which subsequent frames may be displayed. A period of time of the walkdown may be determined by the display driver circuitry 60 (via the image data), calibrated according to display panel characteristics, or the like. The walkdown may occur over 1 period, 2 periods, 3 periods, and so on. For example, the walkdown may occur over 3 periods to allow for a smoother transition of image content from the current frame to the new frame. However, operating at higher refresh rates may cause the electronic display 12 to consume more power. In another example, if the current frame and the new frame are not substantially different, the walkdown may occur over 1 period in order to save power.

Figure 13:
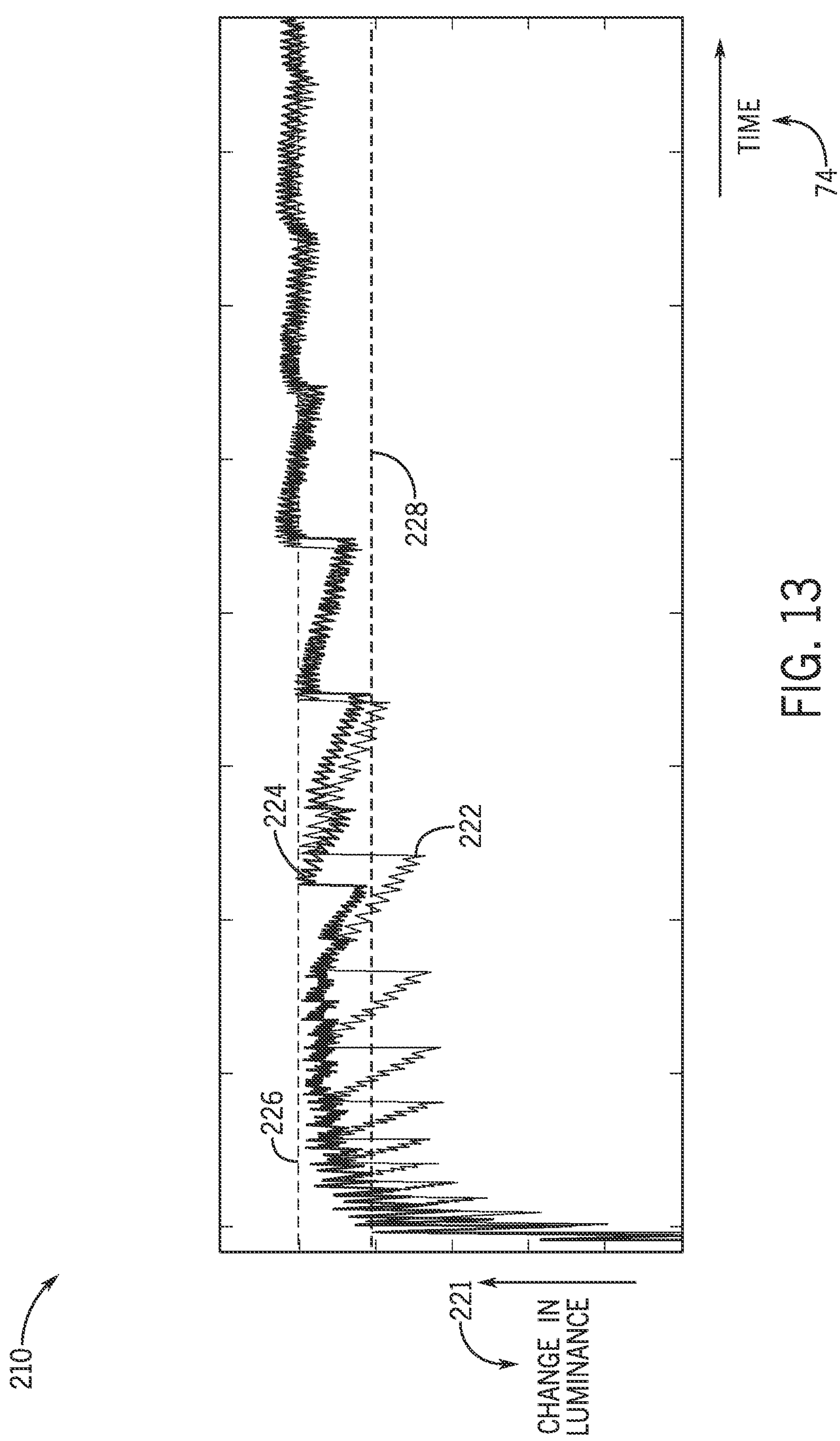
FIG. 13 is a graph illustrating a change in luminance of the electronic display of FIG. 7 over time in the low refresh rate mode, in accordance with an embodiment.

FIG. 13 depicts a graph 210 illustrating a change in luminance 221 over time 74 of the display 12. The graph 210 includes lines 222 and 224 illustrating a coarse frame insertion and a fine frame insertion, respectively, and lines 226 and 228 illustrating a threshold luminance change detectable by the viewer. The change in luminance 221 may be a ratio, a percentage, a fraction, or the like of the change in luminance when image content changes. In certain instances, the viewer may perceive luminance changes of 1% or greater. The line 226 illustrates an upper threshold or an ideal luminance change of 0% when transitioning between frames of image content, while line 228 illustrates a lower threshold or 1% change in luminance 221 when transitioning between frames. As described herein, after a period of time, the display pixels 54 may stabilize to a static luminance, which may be illustrated by the leveling out at the upper threshold (as illustrated by line 226). Changes in luminance 221 below the lower threshold (as illustrated by line 228) may be indicative of detectable luminance changes by the viewer or representative of image artifacts within the image content being displayed. The changes in luminance 221 between the lines 226 and 228 may fall within the threshold luminance change and may be indicative of no luminance changes detected by the viewer.

With the foregoing in mind, the graph 210 illustrates the change in luminance 221 for coarse frame insertions and fine frame insertions over time 74. The display driver circuitry 60 may temporarily increase the refresh rate such that the initial optical response of the display pixels 54 may have luminance differences of less than 1%. For example, the display driver circuitry 60 may implement fine frame insertions for a period of time, then sequence the refresh rate down to the low refresh rate. In another example, the display driver circuitry 60 may implement coarse frame insertions for a period of time, then sequence the refresh rate down to the low refresh rate. The number of frames inserted for the fine frame insertion may be greater than the number of frames inserted for the low frame insertion. As illustrated by line 224, change in luminance 221 of the fine frame insertions may quickly fall between the thresholds. After a period of time, at time t=t1, display 12 implementing the fine frame insertion may be within the threshold change of luminance. With the coarse frame insertion, the display 12 may take a longer period of time to have changes in luminance 221 fall within the threshold. At time t=t1, as represented by point 230, the coarse frame insertion may still have some hysteresis effects influencing the luminance. As such, changes in luminance 221 may still not meet threshold requirements. At time t=t2, as represented by point 232, the coarse frame insertion may be within the threshold limits. Without the frame rate sequencing techniques, it may take a period of time before the image content displayed on the display 12 falls within the threshold.

By way of non-limiting examples, FIGS. 14, 15, 16, and 17 respectively illustrate graphs depicting the luminance 72 over time 74 for the electronic display 12 implementing the frame rate sequencing technique while operating in the low refresh rate mode. As described herein, the electronic display 12 may temporarily increase the refresh rate when transitioning from one frame of image content to another frame of different (or substantially different) image content. It may be beneficial to characterize the display panel to understand the hysteresis profile, the slope characteristics, the luminance change over time, and so on to optimize the increase in refresh rate. For example, increasing the refresh rate too much may cause the display driver circuitry 60 to consume additional power, which may reduce the power saving aspect of operating in the low refresh rate mode. In another example, if the refresh rate is not increased enough, then the viewer may notice changes in luminance and view image artifacts within the image content on the display.

Figure 14:
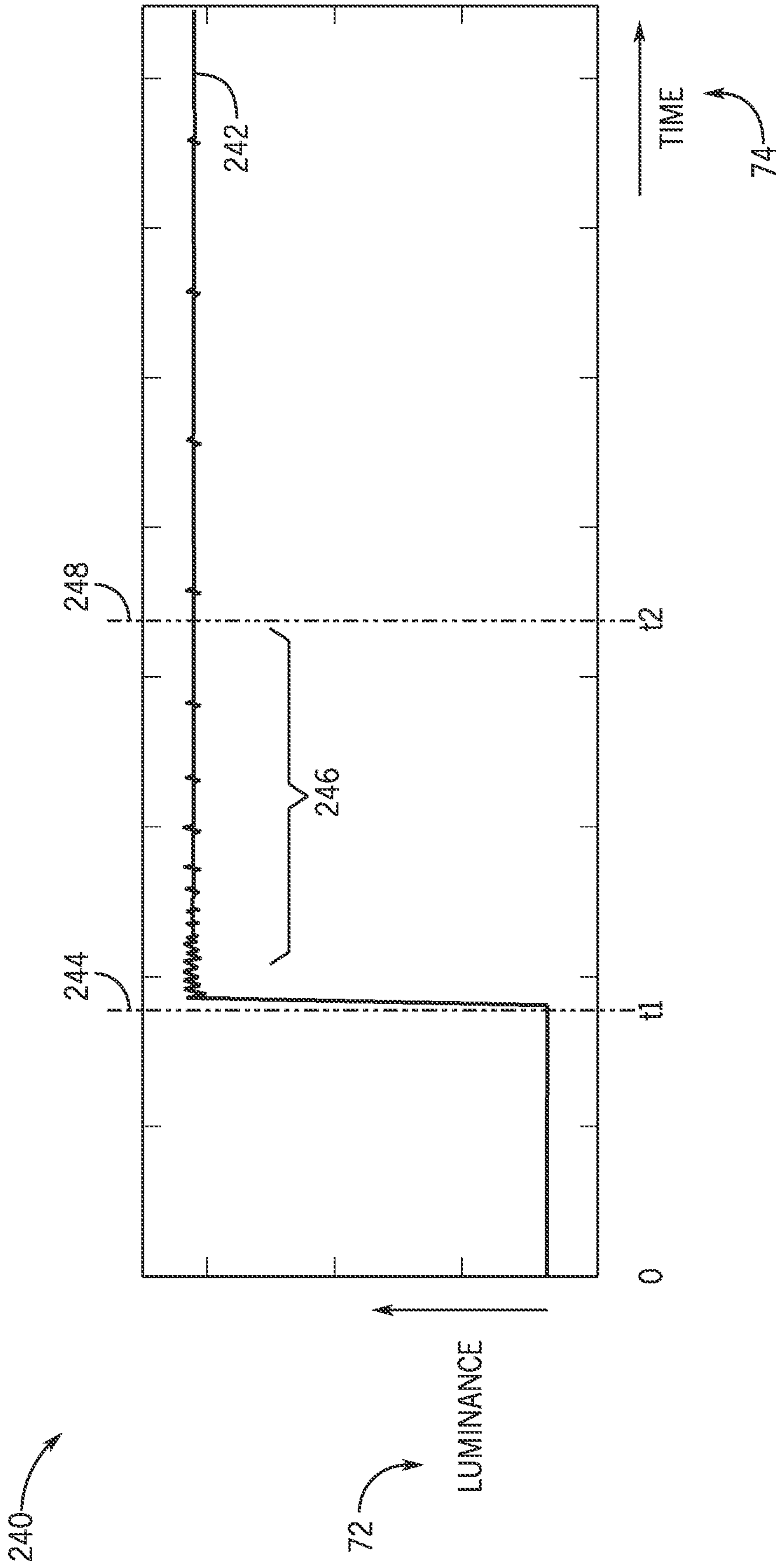
FIG. 14 is a graph illustrating the luminance change over time in the low refresh rate mode with a walkdown, in accordance with an embodiment.

FIG. 14 depicts a graph 240 illustrating the luminance 72 over time 74 following a transition of image content displayed on the electronic display 12. Following a transition from the first frame to the second frame, the electronic display 12 may temporarily increase the refresh rate by inserting multiple frames then walkdown the increased refresh rate. At point 244, the line 242 illustrates a sharp increase in luminance, which may correspond to the transition from the first frame to the second frame. For example, at a time t=t 1, image content displayed may transition from the displayed image content to different image content. By way of example, the display 12 (via the display driver circuitry 60) may temporarily increase the refresh to 60 Hz.

Image content displayed may be refreshed at a higher frequency, thereby reducing or eliminating image artifacts in the initial optical response. Line 242 may illustrate the increased refresh rate as multiple short zig-zags immediately after the point time t=t1. As the zig-zags start spacing out, the line 242 may illustrate tapering down the refresh rate. Indeed, the display 12 may sequence down the higher refresh rate by the walkdown (as illustrated by line portion 246) over a period of time from time=t1 to time=t2. The number of frames being inserted may be slowly reduced or spaced out over time in order to for the refresh rate to taper down to the low refresh rate. For example, a longer period of time for the walkdown may reduce the change in luminance of the display 12 since additional frames may reduce the hysteresis effects of the display pixels 54. At point 248, the line 242 may level out indicating that the display pixels 54 stabilized and the refresh rate has tapered down to the low refresh rate. Indeed, at time t=t2, the display 12 may continue operation in the low refresh rate mode.

Figure 15:
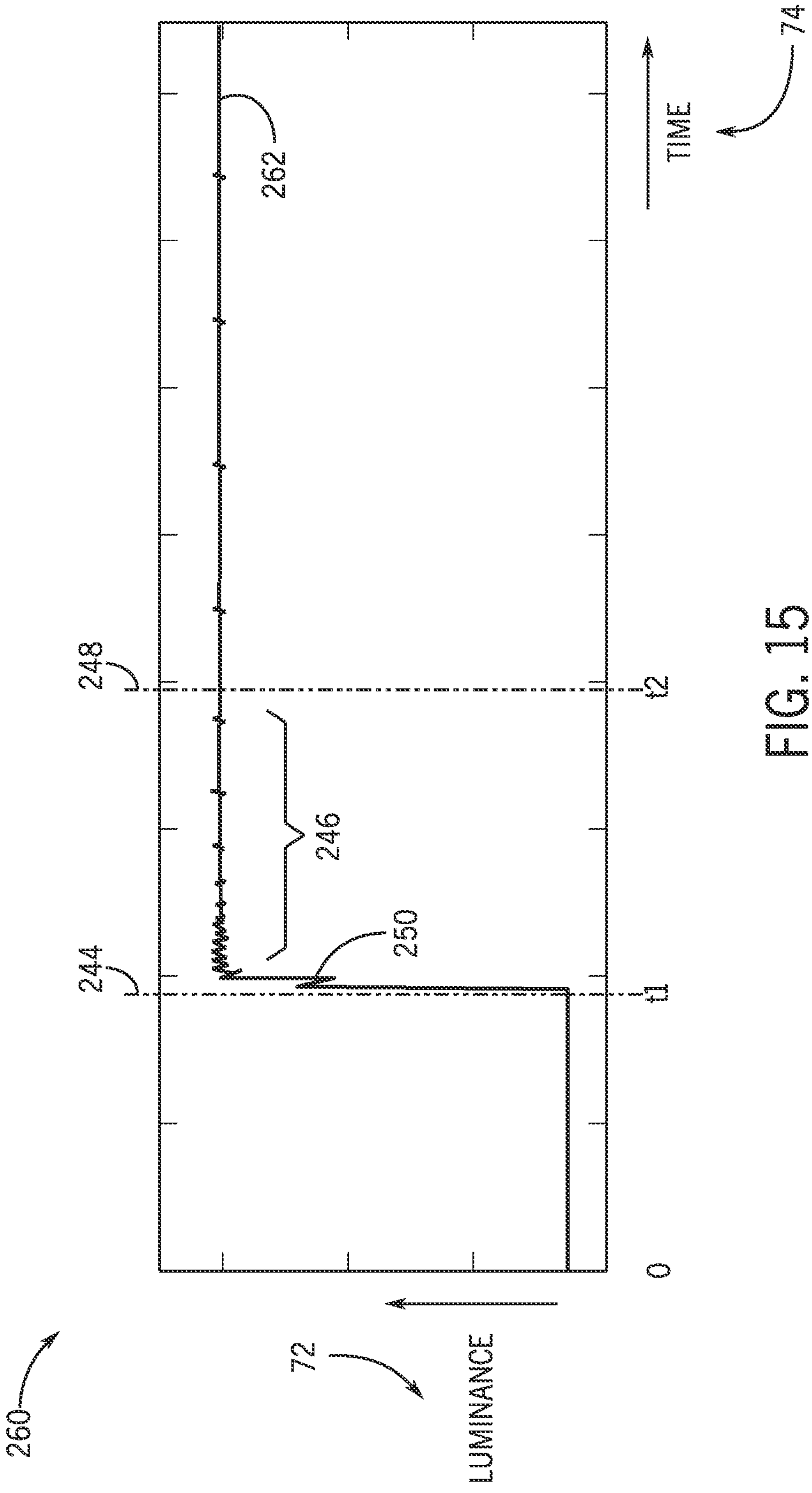
FIG. 15 is a graph illustrating the luminance change over time in the low refresh rate mode with a walkdown, in accordance with an embodiment.

FIG. 15 depicts a graph 260 illustrating the luminance 72 over time 74 following the transition of image content displayed on the electronic display 12. The graph 260 includes a line 262 illustrating the change in luminance 72 of the display 12 following the transition of image content. The display 12 may implement the low refresh rate until the transition from the first frame to the second frame. At point 244, the line 262 illustrates a sharp increase in luminance 72 corresponding to a transition in image content displayed on the display 12. The display 12 (via the display driver circuitry 60 and the display pixels 54) may temporarily increase the refresh rate such that the initial optical response may not have image artifacts. The display 12 may then taper down the refresh rate during the walkdown period (as illustrated by line portion 246). By way of example, the display 12 may temporarily increase to a refresh rate of 20 Hz with a walkdown period of 2.56 seconds.

In comparison to the initial optical response described with reference to FIG. 14, initial optical response of FIG. 15 may have greater changes in luminance 72. At point 244, line 262 illustrates a sharp change in luminance or a peak 250 which may correspond to shifts in luminance 72. Further, the zig-zag pattern of line 262 during the walkdown period may illustrate a change in luminance when implementing a refresh rate of 20 Hz. Indeed, the lower refresh rate may increase error from the first frame to the second frame, thereby increasing the possibility of image artifacts seen by the viewer.

Further, the walkdown period described with reference to FIG. 15 may be shorter than the walkdown period described with reference to FIG. 14. In this way, the display 12 may have a shorter period of time to taper down to the low refresh rate, which may increase luminance shifts within image content on the display 12. However, a shorter walkdown period may allow the electronic display 12 to save power as fewer frames may be inserted.

Figure 16:
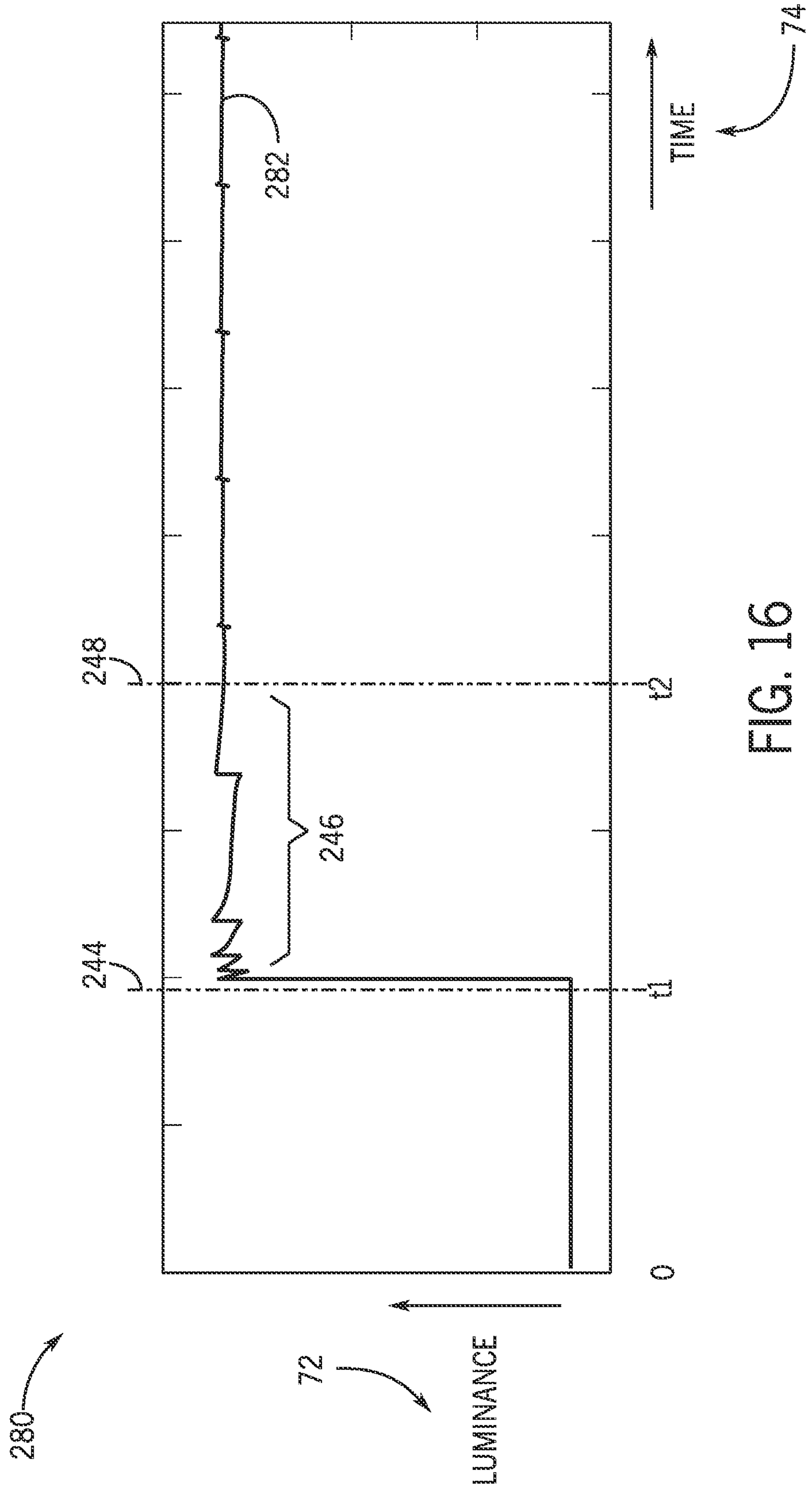
FIG. 16 is a graph illustrating the luminance change over time in the low refresh rate mode with a walkdown, in accordance with an embodiment.

FIG. 16 depicts a graph 280 illustrating the luminance 72 over time 74 following the transition of image content displayed on the display 12. As described with respect to FIG. 13, the display 12 (via the display driver circuitry 60) may implement the coarse frame insertion to save power when temporarily increasing the refresh rate. By way of example, the display 12 may temporarily increase the refresh rate to 60 Hz and implement the coarse frame insertion technique with a walkdown period of 0.42 seconds. The coarse frame insertion may result in greater changes in luminance compared to fine frame insertions. The graph 280 includes line 282 illustrating the luminance 72 of the display 12 over time 74 for the transition. At point 244, the line 282 may illustrate the initial optical response for the transition and the line segment 246 may illustrate the walkdown period. The line segment 246 includes multiple peaks corresponding to changes in luminance 72 of the display 12. Indeed, the luminance change of coarse frame insertions may be greater than the threshold luminance change, as such the viewer may see image artifacts within the image content of the display 12. After the walkdown period, at point 248, the line 282 may level out.

However, the luminance changes after the walkdown period for the coarse frame insertions may be greater than the luminance changes after the walkdown period for the fine frame insertions as described with reference to FIGS. 13 and 14. Indeed, the line 282 may illustrate the zig-zag pattern even after point 248, which may correspond to shifts in luminance.

Figure 17:
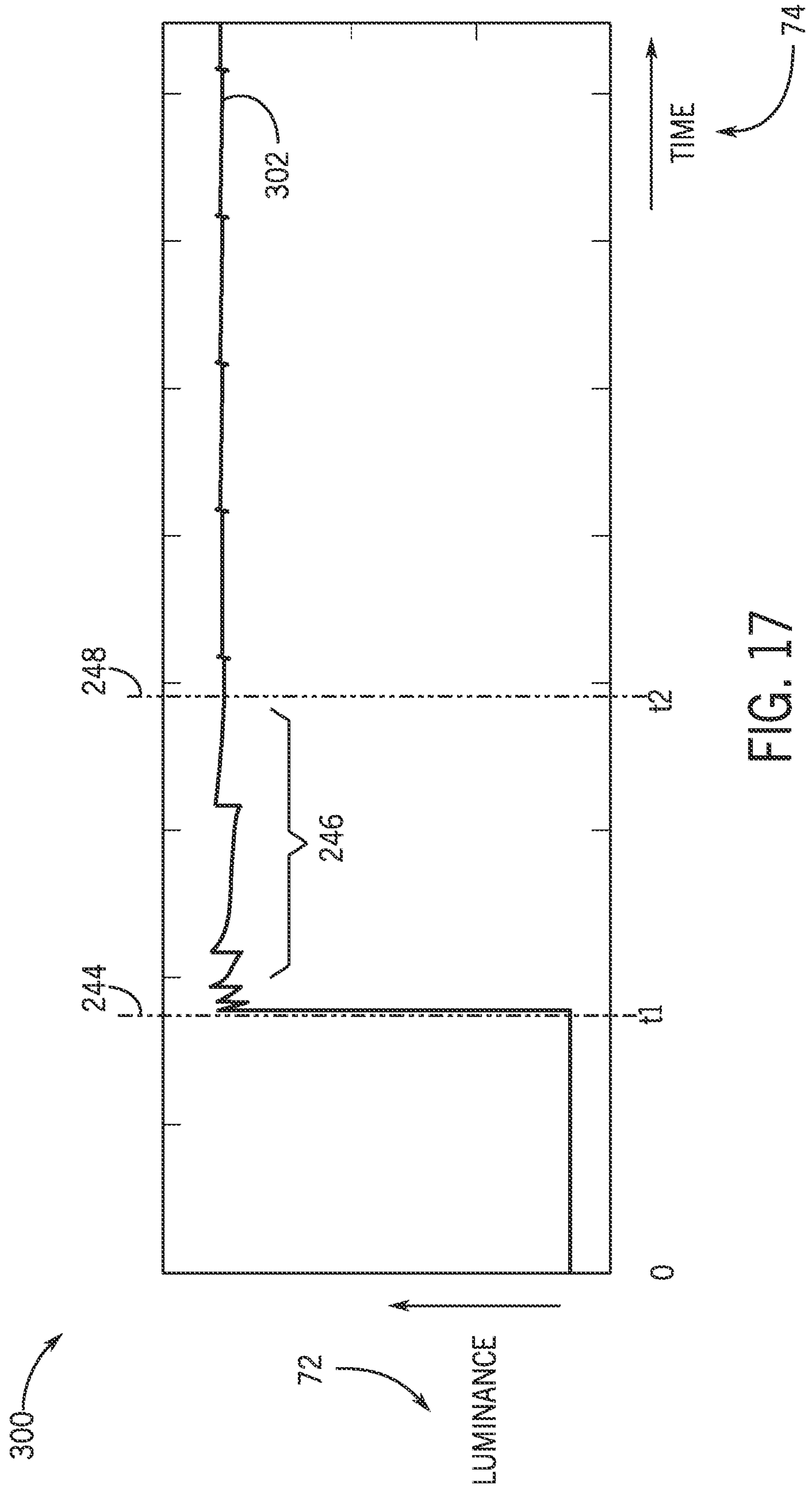
FIG. 17 is a graph illustrating the luminance change over time in the low refresh rate mode with a walkdown, in accordance with an embodiment.

FIG. 17 depicts a graph 300 illustrating the luminance 72 over time 74 following the transition of image content displayed on the display 12. By way of example, the electronic display 12 may temporarily increase the refresh rate to 20 Hz with coarse frame insertions and implement a walkdown of 0.4 seconds. The graph 300 includes line 302 illustrating the luminance 72 of the display 12 over time 74. Following the transition, at point 224, the line 302 illustrates multiple peaks corresponding to changes in luminance. Implementing the coarse frame insertion resulting a decreased number of frames inserted during the walkdown, thereby hysteresis effects may cause greater changes in luminance. A shorter walkdown period may also reduce the number of frames inserted during the walkdown period. As such, greater changes in luminance 72 may be detected when the image content is refreshed. After the walkdown period, at point 248, the line 302 may level out. However, the zig-zag pattern of the line 302 may illustrate some change in luminance after the walkdown. It may be beneficial to understand the properties of the display 12 to optimize the frame insertion technique to reduce or eliminate image artifacts for the initial optical response.

Implementing the frame insertion technique may require calibration of the display panel to determine an optimal refresh rate. However, overall power may be saved by operating in the low refresh rate mode for long periods of time. As such, the viewer, viewing image content on the display, may not notice changes in luminance within the initial optical response when transitioning to different or substantially different image content.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:

processing circuitry configured to generate a first frame of image content and a second frame of image content, wherein the second frame of image content is different from the first frame of image content; and a display configured to display the first frame of image content at a first refresh rate and, in response to receiving the second frame of image content, initially increase the first refresh rate to a second refresh rate before tapering back to the first refresh rate while displaying the second frame of image content.

2. The electronic device of claim 1, wherein the display is configured to temporarily increase the first refresh rate to the second refresh rate by inserting multiple frames of image content similar to the second frame of image content.

3. The electronic device of claim 2, wherein the display is configured to insert the multiple frames of image content with a coarse frame insertion.

4. The electronic device of claim 2, wherein the display is configured to insert the multiple frames of image content with a fine frame insertion.

5. The electronic device of claim 2, wherein a luminance of the first frame is different from a luminance of the second frame, and wherein each of the luminance of the multiple inserted frames matches the luminance of the second frame.

6. The electronic device of claim 1, wherein the first refresh rate is 1 Hz and the second refresh rate is greater than 1 Hz.

7. The electronic device of claim 1, wherein a luminance of the display is configured to stabilize during a walkdown to a static luminance.

8. The electronic device of claim 1, comprising a third frame of image content different from the second frame of image content, wherein the display is configured to operate at the second refresh rate and taper down to the first refresh rate.

9. The electronic device of claim 8, comprising a fourth frame of image content similar to the third frame of image content, wherein the display is configured to operate at the first refresh rate due to the similar image content of the third frame and the fourth frame.

10. The electronic device of claim 1, wherein the display is configured to transition from the first frame of image content to the second frame of image content based on a clock emission signal.

11. An electronic display comprising:

a display panel comprising a display pixel configured to display a first frame of image content and a second frame of image content; and display driver circuitry configured to:

drive the display pixel to display the first frame of image content at a first refresh rate;

when the second frame of image content is different from the first frame of image content:

for a period of time, drive the display pixel to display the second frame of image content at a second refresh rate; and after the period of time, drive the display pixel to display the second frame of image content at the first refresh rate.

12. The electronic display of claim 11, wherein the display driver circuitry is configured to sequence down the refresh rate from the second refresh rate to the first refresh rate during the period of time.

13. The electronic display of claim 11, wherein the display pixel comprises a native hysteresis, and after the period of time, hysteresis effects of the display pixel level out.

14. The electronic display of claim 13, wherein increased sampling of the native hysteresis eliminates the hysteresis effects of the display pixel, and wherein the second refresh rate eliminates the hysteresis effects of the display pixel.

15. A method for operating an electronic display in a low refresh rate mode, the method comprising:

displaying, via display driver circuitry, a first frame of image content at a first refresh rate by driving a display pixel of the electronic display;

determining, via the display driver circuitry, a second frame of image content for display on the electronic display is different from the first frame of image content;

driving, via the display driver circuitry, the display pixel to display the second frame of image content by increasing a refresh rate for a period of time; and after the period of time, driving, via the display driver circuitry, the display pixel to display the second frame of image content at the first refresh rate.

16. The method of claim 15, wherein increasing the refresh rate comprises driving the display pixel to generate a plurality of image frames equivalent to the second frame of image content.

17. The method of claim 16, comprising sequencing the increased refresh rate back down to the first refresh rate by changing a timing of each of the plurality of image frames, wherein the first refresh rate is a low refresh rate.

18. The method of claim 15, comprising:

programming, via the display driver circuitry, image data onto the display pixel, wherein the image data comprises a clock emission signal configured to control a timing of the increased refresh rate and the first refresh rate; and driving, via the display driver circuitry, the display pixel to generate the second frame of image content based on the image data and the clock emission signal.

19. The method of claim 18, wherein the display pixel is configured to generate a plurality of image frames based on the image data and the clock emission signal, wherein the clock emission signal tapers the increased refresh rate to the first refresh rate.

20. The method of claim 15, comprising:

determining, via the display driver circuitry, the second frame of image content is the same as the first frame of image content; and driving, via the display driver circuitry, the electronic display to display the second frame of image content at the first refresh rate.

* * * * *